United States Patent
Cui et al.

(10) Patent No.: US 12,046,175 B2
(45) Date of Patent: Jul. 23, 2024

(54) DRIVE CIRCUIT WITH MULTIPLEXED SIGNAL LINE, ARRAY SUBSTRATE AND DISPLAY PANEL

(71) Applicant: HKC CORPORATION LIMITED, Shenzhen (CN)

(72) Inventors: Jianyu Cui, Shenzhen (CN); Haoxuan Zheng, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 17/902,196

(22) Filed: Sep. 2, 2022

(65) Prior Publication Data
US 2023/0100020 A1    Mar. 30, 2023

(30) Foreign Application Priority Data
Sep. 28, 2021   (CN) .......................... 202111149097.9

(51) Int. Cl.
*G09G 3/20*      (2006.01)
*G09G 3/36*      (2006.01)
(Continued)

(52) U.S. Cl.
CPC ............. *G09G 3/20* (2013.01); *G09G 3/2096* (2013.01); *G09G 3/3674* (2013.01);
(Continued)

(58) Field of Classification Search
CPC ...... G09G 3/2096; G09G 3/3674; G09G 3/20; G09G 3/3677; G09G 3/3266;
(Continued)

(56) References Cited

U.S. PATENT DOCUMENTS 10,203,530 B1 *   2/2019   Xu ................... H01L 29/41733
10,896,654 B2 *   1/2021   Li .......................... G09G 3/3696
(Continued)

FOREIGN PATENT DOCUMENTS

CN        103680386 A      3/2014
CN        103985346 A      8/2014
(Continued)

OTHER PUBLICATIONS

First Office Action issued in counterpart Chinese Patent Application No. 202111149097.9, dated Jun. 30, 2022.

*Primary Examiner* — Xuemei Zheng
(74) *Attorney, Agent, or Firm* — Westbridge IP LLC

(57) ABSTRACT

Disclosed are a drive circuit, an array substrate and a display panel. The first signal line is for receiving and transmitting the first reset control signal after the display of the current frame ends. First ends of the first thin film transistor and the second thin film transistor are connected to the first signal line. Second ends of the first thin film transistor and the second thin film transistor are connected to the second signal line. Third ends of the first thin film transistor and the second thin film transistor are connected to the controlled end and output end of the output module, respectively. The first thin film transistor and the second thin film transistor are for outputting the DC signal to the controlled end and the output end of the output module, respectively, upon receiving the first reset control signal, to reset the output module.

9 Claims, 5 Drawing Sheets

(51) Int. Cl.
  *G02F 1/1335* (2006.01)
  *G02F 1/1345* (2006.01)
(52) U.S. Cl.
  CPC .... *G02F 1/133514* (2013.01); *G02F 1/13454* (2013.01); *G09G 2300/0408* (2013.01); *G09G 2310/08* (2013.01); *G09G 2320/0233* (2013.01)
(58) Field of Classification Search
  CPC ... G09G 2310/0286; G09G 2310/0289; G09G 2310/08; G09G 2320/0233; G02F 1/13454; G11C 19/28
  See application file for complete search history.

(56) References Cited

U.S. PATENT DOCUMENTS

| | | | |
|---|---|---|---|
| 2007/0126684 A1 | 6/2007 | Chang et al. | |
| 2018/0061349 A1* | 3/2018 | Xu | G11C 19/28 |
| 2018/0096644 A1* | 4/2018 | Jang | G11C 19/28 |

FOREIGN PATENT DOCUMENTS

| | | | |
|---|---|---|---|
| CN | 107424575 | A | 12/2017 |
| CN | 108535924 | A | 9/2018 |
| CN | 108735176 | A | 11/2018 |
| CN | 108962121 | A | 12/2018 |
| CN | 108986732 | A | 12/2018 |
| CN | 109300445 | A | 2/2019 |
| CN | 110070838 | A | 7/2019 |
| CN | 212675891 | U | 3/2021 |

* cited by examiner

DRIVE CIRCUIT WITH MULTIPLEXED SIGNAL LINE, ARRAY SUBSTRATE AND DISPLAY PANEL

CROSS-REFERENCE TO RELATED APPLICATIONS

This application claims priority to Chinese Patent Application No. 202111149097.9, filed on Sep. 28, 2021, the entire contents of which is incorporated herein by reference.

TECHNICAL FIELD

The present disclosure relates to the technical field of displays, and in particular, to a drive circuit with a multiplexed signal line, an array substrate and a display panel.

BACKGROUND

The drive circuit of the display panel includes a charging module, an output module and an output reset module. The charging module is for receiving the input signal during operation, and pulling up a potential of a controlled end of the output module, such that the output module outputs the timing control signal accessed to the input end as a gate drive signal to a row of pixel units connected to the output end, to drive a row of pixel units to work. After a frame is displayed, a first reset control signal needs to be accessed to reset each pixel unit on each row.

However, in the related art, an independent signal line is adopted to access the first reset control signal. In this way, a display device with a narrow frame is made by using the Gate Driver on Array (GOA) technology, and the area occupied by the drive circuit on the circuit board is too large, which is not conducive to designing the display device the narrow frame.

SUMMARY

The main objective of the present disclosure is to provide a drive circuit with a multiplexed signal line. The signal line exists on the non-effective display area of the array substrate and does not transmit signals in the frame-by-frame reset stage. After the display of the current frame ends, the signal line is for receiving and transmitting the first reset control signal to the first reset module, and the first thin film transistor and the second thin film transistor in the first reset module can respectively output the DC signal to the controlled end and the output end of the output module, to reset the output module. This further solves the problem that in the related art, the use of a single signal line makes the area occupied by the drive circuit on the circuit substrate too large, which is not conducive to designing the GOA type display device with a narrow frame.

In order to achieve the above objective, the present disclosure provides a drive circuit of a display panel, including a charging module, an output module, a first signal line, and an output reset module. The charging module is for outputting a gate drive signal to a controlled end of the output module when the drive circuit is turned on, the output module is for outputting a high-level timing control signal as the gate drive signal when the drive circuit is turned on, the first signal line is for accessing and transmitting an electrical signal before a display of a current frame ends, and the output reset module is for resetting the output module upon receiving a first reset control signal. The first signal line is for receiving and transmitting the first reset control signal after the display of the current frame ends, the output reset module includes a second signal line for receiving and transmitting a direct current (DC) signal and a first reset module. The first reset module includes a first thin film transistor and a second thin film transistor.

A first end of the first thin film transistor and a first end of the second thin film transistor are respectively connected to the first signal line, a second end of the first thin film transistor and a second end of the second thin film transistor are respectively connected to the second signal line, a third end of the first thin film transistor is connected to the controlled end of the output module, and a third end of the second thin film transistor is connected to an output end of the output module. The first thin film transistor is for outputting the DC signal to the controlled end of the output module upon receiving the first reset control signal, and the second thin film transistor is for outputting the DC signal to the output end of the output module upon receiving the first reset control signal, to reset the output module.

In an embodiment, the first reset control signal is a low-level signal, and the first thin film transistor and the second thin film transistor are P-type thin film transistors.

In an embodiment, the first signal line is further for receiving and transmitting a frame start signal after transmitting the first reset control signal, to display a next frame.

In an embodiment, a voltage value of the first reset control signal is smaller than a voltage value of the frame start signal.

In an embodiment, the first signal line is further for receiving and transmitting the timing control signal after transmitting the first reset control signal, to control a display image of a next frame.

In an embodiment, the voltage value of the first reset control signal is smaller than a voltage value of the timing control signal.

In an embodiment, the first signal line is further for receiving and transmitting a low frequency signal after transmitting the first reset control signal. The output reset module further includes a low frequency module. A controlled end of the low frequency module is connected to the first signal line, an input end of the low frequency module is connected to the second signal line, a first output end of the low frequency module is connected to the controlled end of the output module, and a second output end of the low frequency module is connected to the output end of the output module. The low frequency module is for outputting the DC signal to the controlled end and the output end of the output module respectively upon receiving the low frequency signal, to reset the output module.

The present disclosure further provides a drive circuit of a display panel, including: a charging module, an output module, a first signal line, and an output reset module. The charging module is for outputting a gate drive signal to a controlled end of the output module when the drive circuit is turned on, the output module is for outputting a high-level timing control signal as the gate drive signal when the drive circuit is turned on, the first signal line is for accessing and transmitting an electrical signal before a display of a current frame ends, and the output reset module is for resetting the output module upon receiving a first reset control signal.

The first signal line is for receiving and transmitting the first reset control signal after the display of the current frame ends, the output reset module includes a second signal line for receiving and transmitting a DC signal and a first reset module. The first reset module includes a first thin film transistor and a second thin film transistor.

A first end of the first thin film transistor and a first end of the second thin film transistor are respectively connected to the first signal line, a second end of the first thin film transistor and a second end of the second thin film transistor are respectively connected to the second signal line, a third end of the first thin film transistor is connected to the controlled end of the output module, and a third end of the second thin film transistor is connected to an output end of the output module.

The first thin film transistor is for outputting the DC signal to the controlled end of the output module upon receiving the first reset control signal, and the second thin film transistor is for outputting the DC signal to the output end of the output module upon receiving the first reset control signal, to reset the output module.

The first reset control signal is a low-level signal, and the first thin film transistor and the second thin film transistor are P-type thin film transistors.

The present disclosure further provides an array substrate, including an effective display area and a non-effective display area. A periphery of the effective display area is surrounded by the non-effective display area, and the drive circuit of the display panel as described above is provided in the non-effective display area of the array substrate.

The present disclosure further provides a display panel, including a color filter substrate, a liquid crystal layer, and the array substrate as described above. The liquid crystal layer is provided between the array substrate and the color filter substrate.

In technical solutions of the present disclosure, the first signal line is for receiving and transmitting the first reset control signal after the display of the current frame ends. The second signal line and the first reset module are adopted to output the reset module. The second signal line is for receiving and transmitting a DC signal. The first reset module includes a first thin film transistor and a second thin film transistor. A first end of the first thin film transistor and a first end of the second thin film transistor are respectively connected to the first signal line. A second end of the first thin film transistor and a second end of the second thin film transistor are respectively connected to the second signal line. A third end of the first thin film transistor is connected to the controlled end of the output module. A third end of the second thin film transistor is connected to an output end of the output module. The first thin film transistor is for outputting the DC signal to the controlled end of the output module upon receiving the first reset control signal, and the second thin film transistor is for outputting the DC signal to the output end of the output module upon receiving the first reset control signal, to reset the output module. The first signal line is accessed to the first reset control signal and transmits the first reset control signal during the blank period to reset the output module frame by frame, which can reduce the area of the circuit board occupied by the third signal line, and the non-effective display area around the effective display area can be more miniaturized, which is beneficial to designing the GOA type display device with a narrow frame.

BRIEF DESCRIPTION OF THE DRAWINGS

In order to more clearly illustrate the technical solutions in the embodiments of the present disclosure or in the prior art, the following briefly introduces the accompanying drawings that need to be used in the description of the embodiments or the prior art. Obviously, the drawings in the following description are only some embodiments of the present disclosure. For those of ordinary skill in the art, other drawings can also be obtained based on the structures shown in these drawings without any creative effort.

The realization of the objective, functional characteristics, and advantages of the present disclosure are further described with reference to the accompanying drawings.

DETAILED DESCRIPTION OF THE EMBODIMENTS

The technical solutions in the embodiments of the present disclosure will be clearly and completely described below with reference to the accompanying drawings of the present disclosure. It is obvious that the embodiments to be described are only some rather than all of the embodiments of the present disclosure. All other embodiments obtained by persons skilled in the art based on the embodiments of the present disclosure without creative efforts shall fall within the scope of the present disclosure.

It should be noted that, the descriptions associated with, e.g., "first" and "second," in the present disclosure are merely for descriptive purposes, and cannot be understood as indicating or suggesting relative importance or impliedly indicating the number of the indicated technical feature. Therefore, the feature associated with "first" or "second" can expressly or impliedly include at least one such feature. In addition, the technical solutions between the various embodiments can be combined with each other, but they must be based on the realization of those of ordinary skill in the art. When the combination of technical solutions is contradictory or cannot be achieved, it should be considered that such a combination of technical solutions does not exist, nor is it within the scope of the present disclosure.

Figure 1:
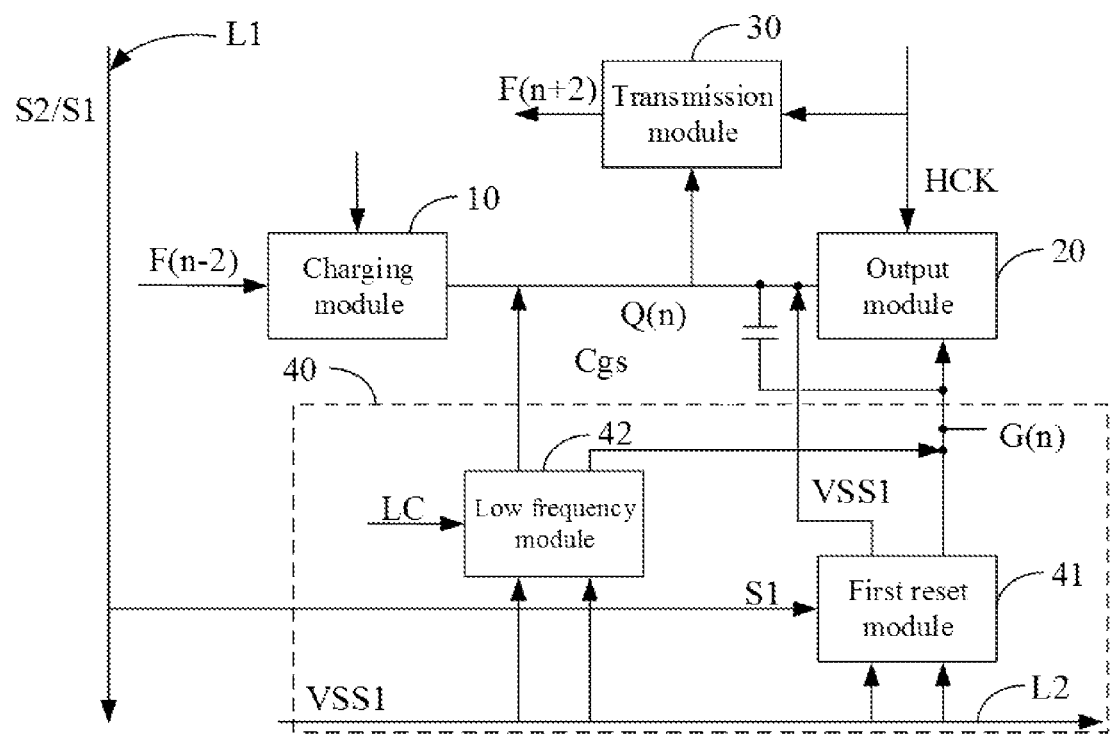
FIG. 1 is a circuit block diagram of a drive circuit of a display panel according to an embodiment of the present disclosure.

As shown in FIG. 1, FIG. 1 shows a drive circuit of a display panel (referred to as a GOA unit). The drive circuit of the display panel includes a charging module 10, an output module 20, a first signal line L1, a transmission module 30 and an output reset module 40. The charging module 10 is turned on when a controlled end thereof receives a high-level timing control signal HCK output by the transmission module 30 in the first two-stage GOA unit. When the charging module 10 is turned on, the high-level gate drive signal F(n−2) output by the output unit in the first two-stage GOA unit is accessed, and the high-level gate drive signal F(n−2) is input to the controlled end of the output module 20 at the current stage and the parasitic capacitance Cgs, to precharge the parasitic capacitance Cgs at the current stage. It should be noted that the input end of the output module 20 at the current stage is usually accessed to a low-level timing control signal CK, and a high-level gate drive signal is not enough to turn on the output module 20 at the current stage. After the parasitic capacitance Cgs is precharged, the output module 20 is turned on when the input end thereof receives the high-level timing control signal HCK. When the output module 20 is turned on, the high-level timing control signal HCK is output to the charging module 10 in the next two-stage GOA unit as the gate drive signal F(n+2) at the current stage. In this embodiment, the double-sided drive design is used to turn on all GOA units stage by stage, to display one frame. One side of the drive circuit turns on the odd-stage GOA unit, and the other side of the drive circuit turns on the even-stage GOA unit. After the display period t1 corresponding to the previous frame ends, and before the display period t1 corresponding to the next frame starts, there is a blank period t2. The timing control board needs to output the first reset control signal S1 during the blank period t2 to control the output reset module 40 to discharge the controlled end and the output end of the output module 20, and the potential of the controlled end and the potential of the output end of the output module 20, that is, the potential of the two ends of the parasitic capacitor Cgs, that is, the potential of the point Q(n) and the potential of the point G(n) are pulled down to a predetermined potential, to facilitate the display control of the next frame.

In this embodiment, the output module 20 includes a fifth thin film transistor T5. The transmission module 30 includes a sixth thin film transistor T6. The charging module 10 includes a seventh thin film transistor T7. Gates of the fifth thin film transistor T5, the sixth thin film transistor T6 and the seventh thin film transistor T7 are the controlled end of the functional module. Drains of the fifth thin film transistor T5, the sixth thin film transistor T6 and the seventh thin film transistor T7 are the output end of the functional module. Sources of the fifth thin film transistor T5, the sixth thin film transistor T6 and the seventh thin film transistor T7 are the output end of the functional module.

The first signal line L1 is a metal layer trace at the non-effective display area on the array substrate, which is to access and transmit an electrical signal S2 for controlling the display of the current frame from the timing control board during the display period t1 of each frame. The electrical signal S2 includes but is not limited to: a timing control signal CK, and a low frequency signal LC. In addition, the first signal line L1 is not to transmit the electrical signal S2 during the blank period t2, that is, to maintain a zero-level signal, or maintain a ground-level signal, or maintain a low-level state. In the technical solution of the present disclosure, the first signal line L1 is accessed to and transmits the first reset control signal S1 during the blank period t2.

The output reset module 40 includes a second signal line L2 for receiving and transmitting a DC signal VSS1, and a first reset module 41.

The first reset module 41 includes a first thin film transistor T1 and a second thin film transistor T2. A first end of the first thin film transistor T1 and a first end of the second thin film transistor T2 are respectively connected to the first signal line L1. A second end of the first thin film transistor T1 and a second end of the second thin film transistor T2 are respectively connected to the second signal line L2. A third end of the first thin film transistor T1 is connected to the controlled end of the output module 20. A third end of the second thin film transistor T2 is connected to an output end of the output module 20. The first thin film transistor T1 is for outputting the DC signal VSS1 to the controlled end of the output module 20 upon receiving the first reset control signal S1, and the second thin film transistor T2 is for outputting the DC signal VSS1 to the output end of the output module 20 upon receiving the first reset control signal S1, to reset the output module 20.

The second signal line L2 can also be a metal layer trace at the non-effective display area on the array substrate. The second signal line L2 can be accessed to a gate off signal in a form of a DC voltage output by the timing control board, that is, the DC signal VSS1 in the present disclosure. The DC signal VSS1 can be a low voltage signal: or can also be a negative voltage signal.

The first reset module 41 is a switch module composed of the first thin film transistor T1 and the second thin film transistor T2. The first end of the first thin film transistor T1 and the second thin film transistor T2 is the gate, the second end of the first thin film transistor T1 and the second thin film transistor T2 is the drain, and the third end of the first thin film transistor T1 and the second thin film transistor T2 is the source. The first thin film transistor T1 and the second thin film transistor T2 can be turned on upon receiving the first reset control signal S1, to access the DC signal VSS1, and can output the accessed DC signal VSS1 to the controlled end and the output end of the output module 20 respectively. Thus, a potential of the controlled end and the output end of the output module 20 can be pulled down to the signal amplitude corresponding to the DC signal VSS1 under the action of the DC signal VSS1, to reset the output module 20.

In the circuit board trace of the drive circuit of the existing display panel, in addition to the first signal line L1, a third signal line is independently set to access and transmit the first reset control signal S1 during the blank period t2. Thus, there are two signal lines in the non-effective display area of the array substrate. Only in this way can the display control in the display period t1 and the frame-by-frame reset in the blank period t2 be realized, and in practical applications, the third signal line is relatively thick and needs to occupy a large frame area. For display devices using GOA technology, the drive circuit of the display panel is fabricated on the substrate around the display area, so that it can replace the external integrated circuit board to complete the driving of the horizontal scanning lines. Thereby, the welding process of the external integrated circuit board is reduced, and the purpose of narrow frame or no frame of the display device is achieved. In actual use, the advantages of narrow border design or borderless design in display devices with large and small screens are very obvious, which can not only improve the visual effect, but also allow users to experience a more immersive effect, and the picture is more shocking. For monitors, when using dual-screen splicing, there is a small gap or seamless connection between the two screens. Therefore, the third signal line in the related art will make the required area of the substrate around the display area too large, thereby causing the frame of the display device to be too wide.

In the technical solutions of the present disclosure, the first signal line L1 is accessed to the first reset control signal S1 and transmits the first reset control signal S1 during the blank period t2, to realize the function of the third signal line. In other words, during the blank period t2, the first signal line L1 is multiplexed into a third signal line, and the first reset module 41 is triggered to output the DC signal VSS1 to the controlled end and the output end of the output module 20 respectively, to reset the output module 20 frame by frame. Compared with the related art, the present disclosure can reduce the area of the circuit board occupied by the third signal line, and the non-effective display area around the effective display area can be more miniaturized, which is beneficial to designing the GOA type display device with a narrow frame.

Figure 2:
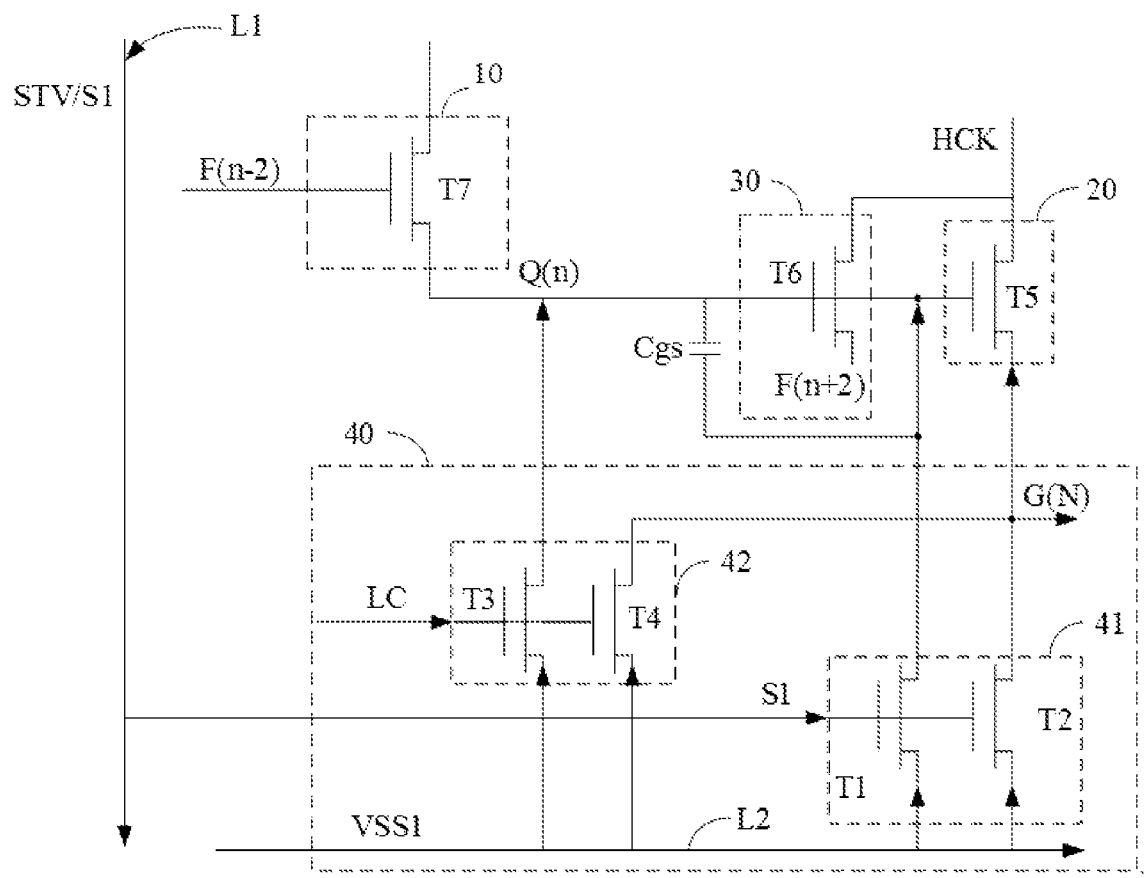
FIG. 2 is a circuit schematic diagram of the drive circuit of the display panel according to an embodiment of the present disclosure.
Figure 4:
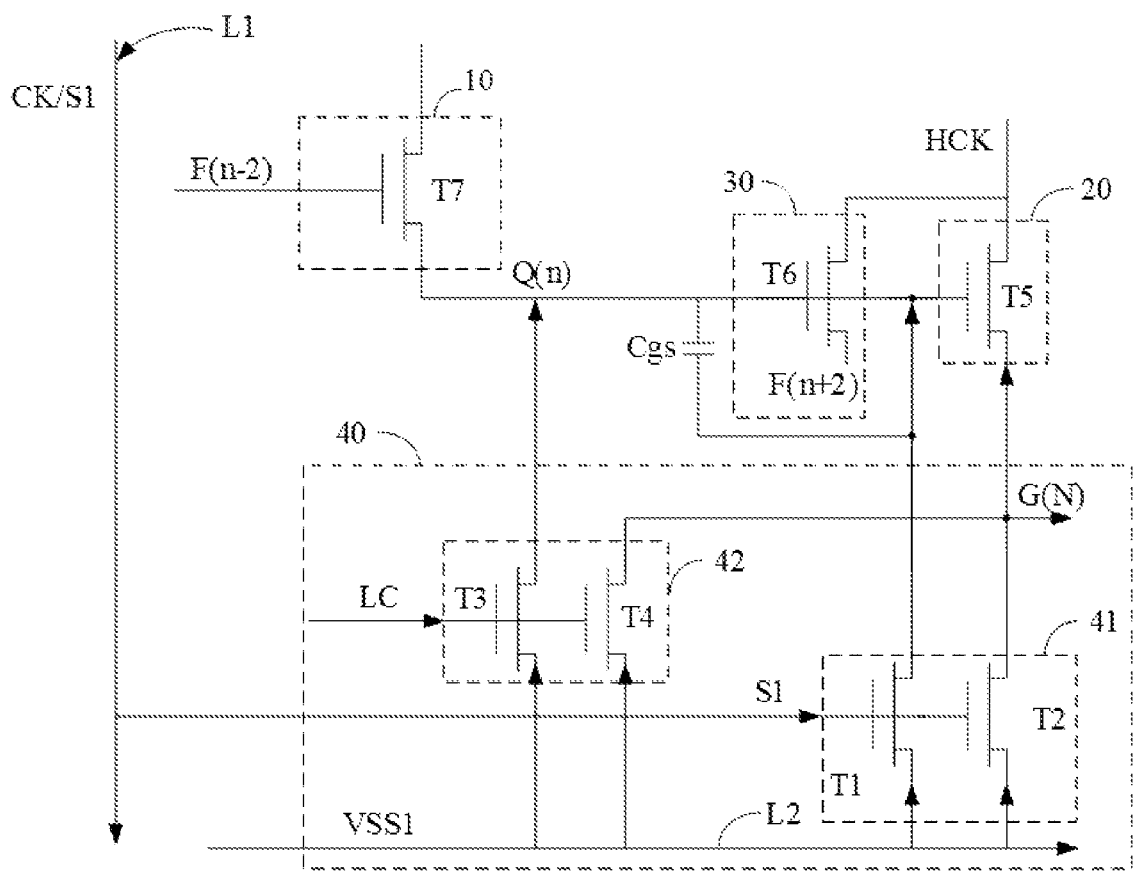
FIG. 4 is a circuit schematic diagram of the drive circuit of the display panel according to another embodiment of the present disclosure.
Figure 6:
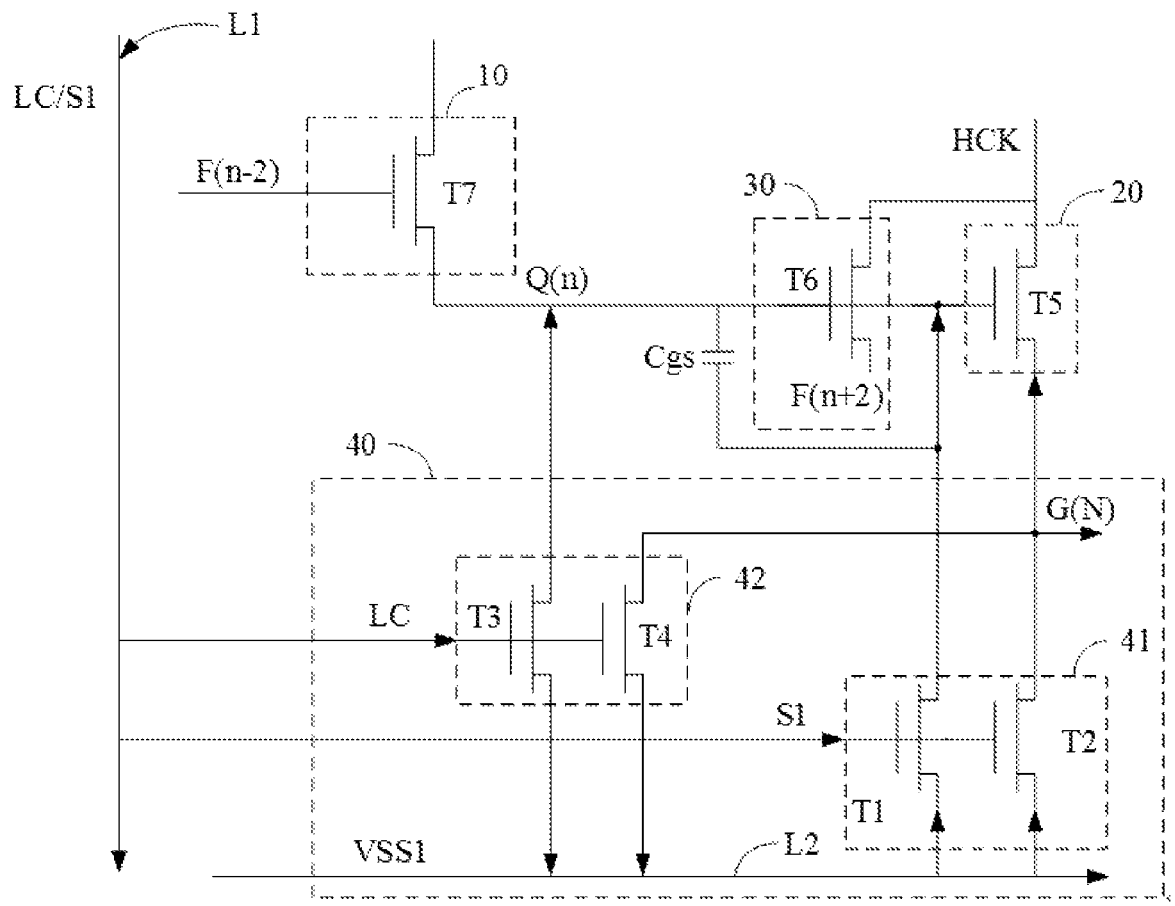
FIG. 6 is a circuit schematic diagram of the drive circuit of the display panel according to yet another embodiment of the present disclosure.

As shown in FIG. 2, FIG. 4 and FIG. 6, the first reset control signal S1 is a low-level signal. The first thin film transistor T1 and the second thin film transistor T2 are P-type thin film transistors.

In the existing GOA units, functional modules such as the charging module 10, the output module 20, and the transmission module 30 are provided with N-type thin film transistors. That is, in this embodiment, the third thin film transistor T3, the fourth thin film transistor T4, the fifth thin film transistor T5, the sixth thin film transistor T6 and the seventh thin film transistor T7 are all N-type thin film transistors. The N-type thin film transistor is turned on upon receiving a high-level signal. The first signal line L1 can transmit a high-level electrical signal S2 (hereinafter referred to as a high-level signal) for controlling the conduction of the N-type thin film transistor in the corresponding functional module and/or a high-level signal accessed when the N-type thin film transistor is turned on during the display period t1. Therefore, if the first thin film transistor T1 and the second thin film transistor T2 also use N-type thin film transistors, such that when the first signal line L1 transmits a high-level signal during the display period t1, the output reset module 40 is erroneously triggered to reset the output unit, which affects the display effect of the current frame. When the first reset control signal S1 of a high-level signal is transmitted during the blank period t2, the N-type thin film transistors in the corresponding functional modules are also triggered to be mis-turned, which affects the display effect of the next frame. In order to solve the above problem, in technical solutions of the present disclosure, the first thin film transistor T1 and the second thin film transistor T2 are P-type thin film transistors, the first reset control signal S1 is a low-level signal, and the low-level signal cannot trigger the conduction of the N-type thin film transistor. Therefore, the problem that the output reset module 40 is erroneously triggered and the high-level first reset control signal S1 erroneously triggers other functional modules is solved, which is beneficial to improve the working stability of the display device.

Figure 3:
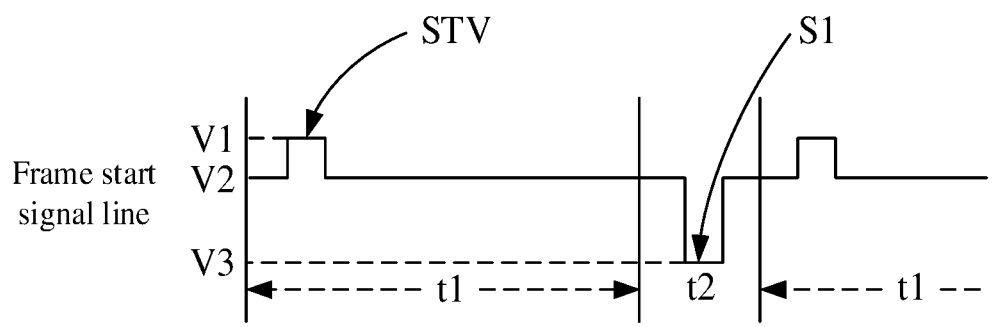
FIG. 3 is a timing diagram of a frame start signal line transmitting an electrical signal in the drive circuit of the display panel according to an embodiment of the present disclosure.

As shown in FIG. 3, the first signal line L1 is further for receiving and transmitting a frame start signal STV after transmitting the first reset control signal S1, to display a next frame.

The first signal line L1 can be a frame start signal line. The frame start signal line is for receiving the frame start signal STV output by the frame start signal STV board when the next frame starts to display. The frame start signal STV has two voltage levels: a first voltage level V1 and a second voltage level V2, and the first voltage level V1 is higher than the second voltage level V2. The frame start signal STV is output to the charging module 10 of the GOA unit of the previous preset stage to precharge the GOA unit of the previous preset stage, to display the next frame. It should be noted that the display panel is provided with multi-stage GOA units, and the GOA unit of the previous preset stage is the first several stages of GOA units in the multi-stage GOA unit along the direction with the pixels are turned on stage by stage. The number corresponding to the preset stage is at least one stage. In the display period t1 corresponding to the current frame, after the frame start signal line transmits the frame start signal STV, the state of the second voltage level V2 is maintained until the display period t1 corresponding to the next frame starts. Therefore, it can be used to realize the first signal line L1 of the technical solution. In addition, the voltage level V3 of the first reset control signal S1 (in this embodiment, the voltage level of the first reset control signal S1 is the third voltage level V3) can be lower than the first voltage level V1, or can be lower than the second voltage level V2. Thus, on the premise that the first thin film transistor T1 and the second thin film transistor T2 are P-type thin film transistors, the problem that the N-type first thin film transistor T1 and the N-type second thin film transistor T2 can prevent the pre-charging of the GOA unit of the previous preset stage can be avoided, and the situation that the first reset control signal of the high-level signal will cause an impact on the potential of the Q(n) point of the previous preset stage and the charge pump capacitor on the timing control board can also be avoided. Therefore, the stability of the potential of the G(n) point when the next frame is displayed can be improved, which is also beneficial to improve the display stability of the next frame and the working stability of the display device.

Figure 5:
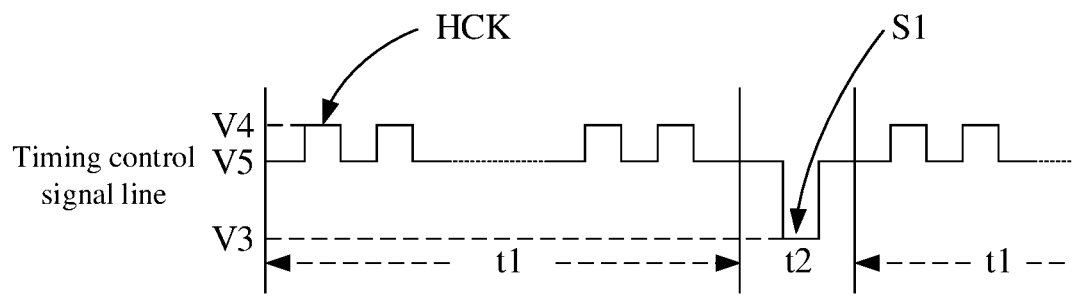
FIG. 5 is a timing diagram of a timing control signal line transmitting an electrical signal in the drive circuit of the display panel according to an embodiment of the present disclosure.

As shown in FIG. 4 and FIG. 5, the first signal line L1 is further for receiving and transmitting the timing control signal CK after transmitting the first reset control signal S1, to control a display image of a next frame.

The first signal line L1 can be a timing control signal line. The timing control signal line is for receiving the timing control signal CK output by the timing control board when the next frame starts to display. The timing control signal CK has two voltage levels: a fourth voltage level V4 and a fifth voltage level V5, and the fourth voltage level V4 is higher than the fifth voltage level V5. The timing control signal CK is output to the output module 20 and the transmission module 30 of each GOA unit, to provide the timing control signal CK for the output module 20 and the transmission module 30 of each stage of GOA unit, so as to control the multi-level pixels to be turned on stage by stage, thereby controlling the display of the next frame. After the timing control signal CK corresponding to the current frame is transmitted, the timing control signal line keeps the fifth voltage level V5 during the blank period t2 until the display period t1 corresponding to the next frame starts. Therefore, it can be used to realize the first signal line L1 of the technical solution. Besides, in this embodiment, the third voltage level V3 can be lower than the fourth voltage level V4, or can be lower than the fifth voltage level V5. Thus, on the premise that the first thin film transistor T1 and the second thin film transistor T2 are P-type thin film transistors, it can avoid the problem that the high-level first reset control signal S1 will cause the potential of the controlled end and the potential of the output end of the output module 20 to be too high during reset, resulting in the output module 20 being mis-triggered and turned on, which is beneficial to improve the switching stability of each frame and the display stability of the next frame.

Figure 7:
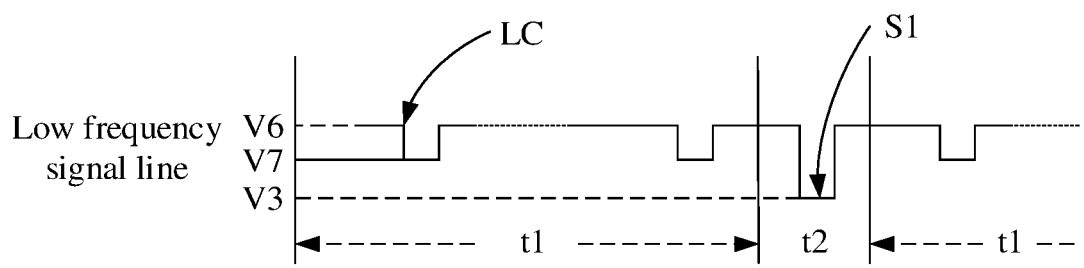
FIG. 7 is a timing diagram of a low frequency signal line transmitting an electrical signal in the drive circuit of the display panel according to an embodiment of the present disclosure.

As shown in FIG. 6 and FIG. 7, the first signal line L1 is further for receiving and transmitting a low frequency signal LC after transmitting the first reset control signal S1.

The output reset module 40 further includes a low frequency module 42.

A controlled end of the low frequency module 42 is connected to the first signal line L1. An input end of the low frequency module 42 is connected to the second signal line L2. A first output end of the low frequency module 42 is connected to the controlled end of the output module 20. A second output end of the low frequency module 42 is connected to the output end of the output module 20. The low frequency module 42 is for outputting the DC signal VSS1 to the controlled end and the output end of the output module 20 respectively upon receiving the low frequency signal LC, to reset the output module 20.

In practical applications, the design of multiple timing control signal lines will be applied in the display panel, such as: 4 timing control signal line design, 6 timing control signal line design or 8 timing control signal line design. The GOA unit corresponding to the number of clock lines is a group of GOA units. To simplify the expression, the following clock lines are used to describe multiple timing control signal lines. The existing display device is also provided with a low frequency signal line. The low frequency signal LC is for accessing and transmitting the low frequency signal LC from the timing control board to the low frequency module 42 of each GOA unit in the GOA unit group after the pixels of the corresponding stage of a group of GOA units are turned on. The low frequency signal LC has two voltage levels: a sixth voltage level V6 and a seventh voltage level V7, and the sixth voltage level V6 is higher than the seventh voltage level V7. The output module 20 is reset by triggering each low frequency module 42, so as to realize the periodic reset of the group of GOA units. However, the low frequency signal line also keeps the seventh voltage level V7 during the blank period t2, until the pixel of the corresponding stage of the first GOA unit group is turned on during the display period t1 corresponding to the next frame, and it can also be used to implement the first signal line L1 of the technical solution. In addition, in this embodiment, the third voltage level V3 can be lower than the sixth voltage level V6, or can be lower than the seventh voltage level V7.

As shown in FIG. 2, FIG. 4 and FIG. 6, the low frequency module 42 may include a third thin film transistor T3 and a fourth thin film transistor T4. The gate of the third thin film transistor T3 and the gate of the fourth thin film transistor T4 are respectively connected to the first signal line L1. The drain of the third thin film transistor T3 and the drain of the fourth thin film transistor T4 are respectively connected to the second signal line L2. The source of the third thin film transistor T3 is connected to the controlled end of the output module 20. The source of the fourth thin film transistor T4 is connected to the output end of the output module 20. The third thin film transistor T3 is for outputting the DC signal VSS1 to the controlled end of the output module 20 upon receiving the second reset control signal, and the fourth thin film transistor T4 is for outputting the DC signal VSS1 to the output end of the output module 20 upon receiving the second reset control signal, to reset the output module 20. It should be noted that both the third thin film transistor T3 and the fourth thin film transistor T4 can be N-type thin film transistors or P-type thin film transistors, and the signal amplitude of the first reset control signal S1 can be consistent with the signal amplitude of the low frequency signal LC. Thus, when the first reset control signal S1 performs frame-by-frame reset, the low frequency module 42 can be triggered to perform periodic reset at the same time, to realize double reset during the blank period t2, which is beneficial to improve the stability of reset.

The present disclosure further provides a drive circuit of a display panel, including: a charging module 10, an output module 20, a first signal line L1, and an output reset module 40. The charging module 10 is for outputting a gate drive signal to a controlled end of the output module 20 when the drive circuit is turned on. The output module 20 is for outputting a high-level timing control signal HCK as the gate drive signal when the drive circuit is turned on. The first signal line L1 is for accessing and transmitting an electrical signal S2 before the display of a current frame ends. The output reset module 40 is for resetting the output module 20 upon receiving a first reset control signal S1. The first signal line L1 is for receiving and transmitting the first reset control signal S1 after the display of the current frame ends.

The output reset module 40 includes a second signal line L2 for receiving and transmitting a DC signal VSS1, and a first reset module 41.

The first reset module 41 includes a first thin film transistor T1 and a second thin film transistor T2. A first end of the first thin film transistor T1 and a first end of the second thin film transistor T2 are respectively connected to the first signal line L1. A second end of the first thin film transistor T1 and a second end of the second thin film transistor T2 are respectively connected to the second signal line L2. A third end of the first thin film transistor T1 is connected to the controlled end of the output module 20. A third end of the second thin film transistor T2 is connected to an output end of the output module 20. The first thin film transistor T1 is for outputting the DC signal VSS1 to the controlled end of the output module 20 upon receiving the first reset control signal S1, and the second thin film transistor T2 is for outputting the DC signal VSS1 to the output end of the output module 20 upon receiving the first reset control signal S1, to reset the output module 20. The first reset control signal S1 is a low-level signal, and the first thin film transistor T1 and the second thin film transistor T2 are P-type thin film transistors.

The specific structures of the charging module 10, the output module 20, the output reset module 40, the first signal line L1, the second signal line L2 and the first reset module 41 may refer to the above embodiments. Since the present drive circuit adopts some of the technical solutions of the above-mentioned drive circuit, it has at least the corresponding beneficial effects brought about by some of the technical solutions of the above-mentioned embodiments, which will not be repeated herein. The P-type first thin film transistor T1 and the P-type second thin film transistor T2 can be turned on upon receiving the first reset control signal S1 of the low-level signal, to access the DC signal VSS1, and output the accessed DC signal VSS1 to the controlled end and the output end of the output module 20 respectively. Thus, the potential of the controlled end and the output end of the output module 20 can be pulled down to the signal amplitude corresponding to the DC signal VSS1 under the action of the DC signal VSS1, to reset the output module 20. The first signal line L1 is accessed to the first reset control signal and transmits the first reset control signal S1 during the blank period t2 to realize the function of the third signal line and trigger the frame-by-frame reset of the output module 20 by the first reset module 41. Compared with the related art, the present disclosure can reduce the area of the circuit board occupied by the third signal line, and the non-effective display area around the effective display area can be more miniaturized, which is beneficial to designing the GOA type display device with a narrow frame. In the technical solutions of the present disclosure, the first thin film transistor T1 and the second thin film transistor T2 are P-type thin film transistors, the first reset control signal S1 is a low-level signal, to take advantage of the characteristic that the N-type thin film transistor cannot be turned on by a low-level signal. Therefore, the problem that the output reset module 40 is erroneously triggered and the high-level first reset control signal S1 erroneously triggers other functional modules is solved, which is beneficial to improve the working stability of the display device.

Figure 8:
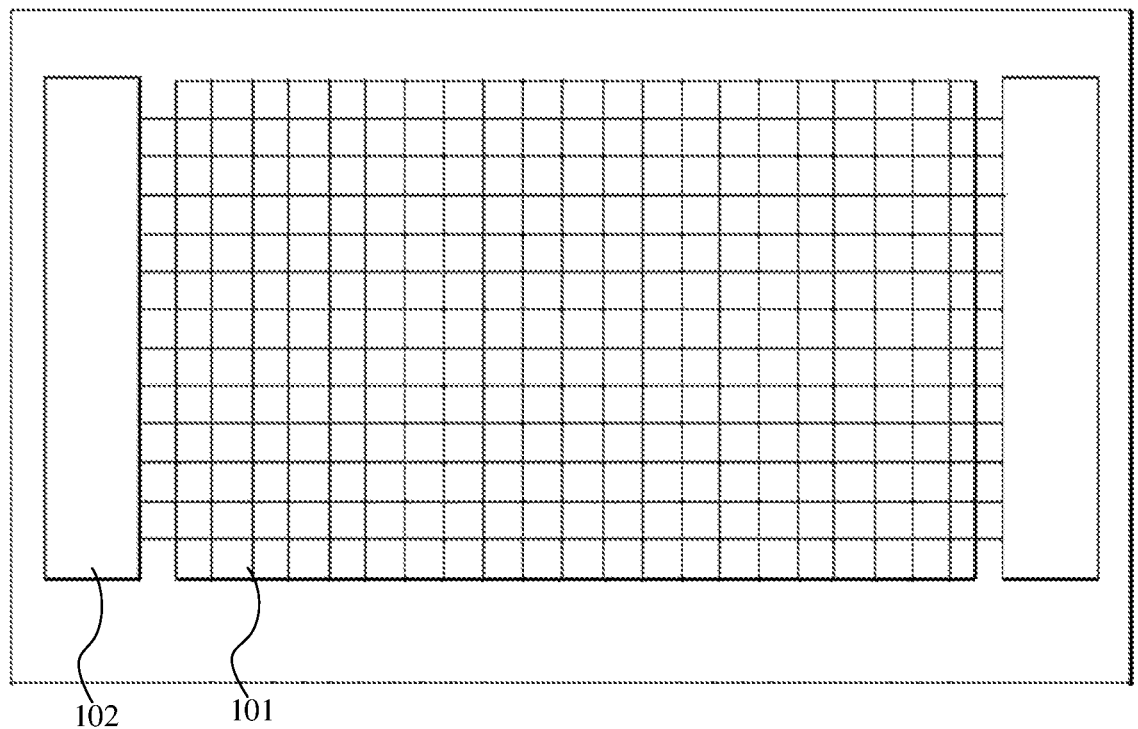
FIG. 8 is a schematic structural diagram of an array substrate according to an embodiment of the present disclosure.

As shown in FIG. 8, FIG. 8 shows an array substrate. The array substrate includes an effective display area 101 and a non-effective display area. The non-effective display area surrounds the periphery of the effective display area 101, and the above-mentioned drive circuit 102 of the display panel is provided in the non-effective display area of the array substrate. The specific structure of the drive circuit of the display panel refers to the above-mentioned embodiment. Since the array substrate adopts all the technical solutions of the above-mentioned embodiments, it has at least all the beneficial effects brought by the technical solutions of the above-mentioned embodiments, which will not be repeated herein.

Figure 9:
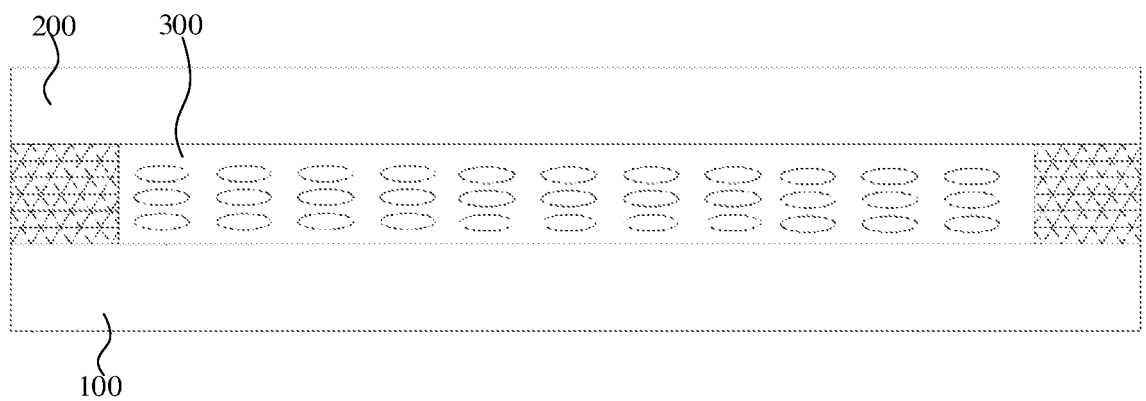
FIG. 9 is a schematic structural diagram of a display panel according to an embodiment of the present disclosure.

As shown in FIG. 9, FIG. 9 shows a display panel. The display panel includes an array substrate 100, a color filter substrate 200 and a liquid crystal layer 300, and the liquid crystal layer 300 is provided between the array substrate 100 and the color filter substrate 200. The specific structure of the array substrate 100 refers to the above-mentioned embodiments. Since the present display panel adopts all the technical solutions of the above-mentioned embodiments, it has at least all the beneficial effects brought about by the technical solutions of the above-mentioned embodiments, which will not be repeated herein.

The above are only some embodiments of the present disclosure, and do not limit the scope of the present disclosure thereto. Under the inventive concept of the present disclosure, equivalent structural transformations made according to the description and drawings of the present disclosure, or direct/indirect application in other related technical fields are included in the scope of the present disclosure.

What is claimed is:

1. A drive circuit with a multiplexed signal line, applied on a display panel, comprising:
    a first thin film transistor, a second thin film transistor, a fifth thin film transistor, a six thin film transistor, and a seventh thin film transistor;
    a first signal line; and
    a second signal line;
    wherein:
    the first thin film transistor and the second thin film transistor are P-type thin film transistors;
    the fifth thin film transistor, the six thin film transistor, and the seventh thin film transistor are N-type thin film transistors;
    a controlled end of the seventh thin film transistor is connected to a drain of a six thin film transistor in a first two-stage drive circuit for receiving a high-level timing control signal from the drain of the six thin film transistor in the first two-stage drive circuit, and receiving a high-level gate drive signal after being turned on;
    a drain of the seventh thin film transistor is connected to a controlled end of the fifth thin film transistor for outputting the high-level gate drive signal to the controlled end of the fifth thin film transistor;
    an input end of the fifth thin film transistor is configured to receive the high-level timing control signal as a gate drive signal, and output the gate drive signal to a controlled end of a seventh thin film transistor in a next two-stage drive circuit after being turned on;
    the first signal line is a metal layer trace and configured for accessing and transmitting an electrical signal from a timing control board for controlling a display of a current frame during a display period of each frame;
    the first signal line is configured for receiving a first reset control signal after the display of the current frame ends;
    a gate of the first thin film transistor and a gate of the second thin film transistor are respectively connected to the first signal line, a drain of the first thin film transistor and a drain of the second thin film transistor are respectively connected to the second signal line, a source of the first thin film transistor is connected to the controlled end of the fifth thin film transistor, and a source of the second thin film transistor is connected to a drain of the fifth thin film transistor;
    the second signal line is configured for receiving a direct current (DC) signal from the timing control board and transmitting the DC signal to the drain of the first thin film transistor and the drain of the second thin film transistor;
    the first thin film transistor is further configured for outputting the DC signal to the controlled end of the fifth thin film transistor upon receiving the first reset control signal
    the second thin film transistor is further configured for outputting the DC signal to the drain of the fifth thin film transistor upon receiving the first reset control signal, to reset the fifth thin film transistor; and
    the first signal line is further configured for receiving and transmitting the timing control signal after transmitting the first reset control signal, to control a display image of a next frame.

2. The drive circuit with the multiplexed signal line of claim 1, wherein the first signal line is further for receiving and transmitting a frame start signal after transmitting the first reset control signal, to display a next frame.

3. The drive circuit with the multiplexed signal line of claim 2, wherein the first signal line is a frame start signal line, and the frame start signal line is for receiving the frame start signal when the next frame starts to display.

4. The drive circuit with the multiplexed signal line of claim 2, wherein a voltage value of the first reset control signal is smaller than a voltage value of the frame start signal.

5. The drive circuit with the multiplexed signal line of claim 1, wherein the voltage value of the first reset control signal is smaller than a voltage value of the timing control signal.

6. The drive circuit with the multiplexed signal line of claim 1, wherein:
    the first signal line is further configured for receiving and transmitting a low frequency signal after transmitting the first reset control signal;
    the drive circuit further comprises a third thin film transistor and a fourth thin film transistor;
    a gate end of the third thin film transistor and a gate end of the fourth thin film transistor are connected to the first signal line for receiving the low frequency signal;
    a drain of the third thin film transistor and a drain of the fourth thin film transistor are respectively connected to the second signal line;

a source of the third thin film transistor is connected to the controlled end of the fifth thin film transistor, and a source of the fourth thin film transistor is connected to the drain of the fifth thin film transistor; and the third thin film transistor is configured for outputting the DC signal to the controlled end of the fifth thin film transistor upon receiving the low frequency signal; and the fourth thin film transistor is configured for outputting the DC signal to the drain of the fifth thin film transistor upon receiving the low frequency signal, to reset the output module.

7. The drive circuit with the multiplexed signal line of claim 6, wherein both the third thin film transistor and the fourth thin film transistor are N-type thin film transistors.

8. An array substrate, comprising:
an effective display area; and
a non-effective display area,
wherein a periphery of the effective display area is surrounded by the non-effective display area, and the drive circuit with the multiplexed signal line of claim 1 is provided in the non-effective display area of the array substrate.

9. A display panel, comprising:
a color filter substrate;
a liquid crystal layer; and
the array substrate of claim 8,
wherein the liquid crystal layer is provided between the array substrate and the color filter substrate.

* * * * *